United States Patent
Onishi et al.

(10) Patent No.: US 10,160,418 B2
(45) Date of Patent: Dec. 25, 2018

(54) FRONT VEHICLE-BODY STRUCTURE

(71) Applicant: MAZDA MOTOR CORPORATION, Hiroshima (JP)

(72) Inventors: Hideaki Onishi, Hatsukaichi (JP); Ryo Komuta, Aki-gun (JP); Kenji Ohtani, GTO (MX); Hiroyuki Yoshimoto, Hiroshima (JP); Hiroshi Sogabe, Aki-gun (JP); Masatoki Kito, Hiroshima (JP); Kazuya Matsumoto, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/608,365

(22) Filed: May 30, 2017

(65) Prior Publication Data
US 2017/0349124 A1    Dec. 7, 2017

(30) Foreign Application Priority Data

Jun. 7, 2016  (JP) ................................ 2016-113183

(51) Int. Cl.
| | |
|---|---|
| *B60R 21/34* | (2011.01) |
| *B60R 19/02* | (2006.01) |
| *B60R 19/18* | (2006.01) |
| *B62D 25/08* | (2006.01) |
| *B62D 25/12* | (2006.01) |

(52) U.S. Cl.
CPC ............ *B60R 21/34* (2013.01); *B60R 19/023* (2013.01); *B60R 19/18* (2013.01); *B60R 2019/1813* (2013.01); *B60R 2019/1886* (2013.01); *B60R 2021/343* (2013.01); *B62D 25/084* (2013.01); *B62D 25/12* (2013.01)

(58) Field of Classification Search
CPC ...... B62D 25/084; B62D 25/05; B62D 25/12; B60R 21/34; B60R 19/18; B60R 19/023
USPC ............................ 296/187.04, 193.1, 193.11
See application file for complete search history.

(56) References Cited

U.S. PATENT DOCUMENTS

| | | | |
|---|---|---|---|
| 2005/0253420 A1* | 11/2005 | Roussel ................. | B60R 19/52 296/203.02 |
| 2006/0064845 A1* | 3/2006 | Fujii ...................... | B60R 21/34 16/82 |
| 2006/0163915 A1 | 7/2006 | Ikeda et al. | |
| 2008/0272618 A1 | 11/2008 | Ikeda et al. | |

(Continued)

FOREIGN PATENT DOCUMENTS

| | | | | |
|---|---|---|---|---|
| DE | 102007063220 A1 * | 1/2009 | ............. | B60R 21/34 |
| EP | 1 120 331 A2 | 8/2001 | | |
| JP | 2005-096512 A | 4/2005 | | |

*Primary Examiner* — Jason S Morrow
(74) *Attorney, Agent, or Firm* — Studebaker & Brackett PC (57) ABSTRACT

An impact absorbing member is provided below a fascia upper member (upper-face forming member) which forms an upper face of a front end portion of a vehicle. The impact absorbing member comprises a front side part which includes a front wall portion, a top wall portion, and a rear wall portion so as to have a U-shaped cross section opening downward and a flat-plate shaped rear side part which extends rearward from a lower end of the rear wall portion. A rear end portion of the rear side part is held at a radiator shroud as a vehicle-body-side member, and the rear side part is configured to slant obliquely forward and downward.

17 Claims, 8 Drawing Sheets

(56) References Cited

U.S. PATENT DOCUMENTS

| | | | |
|---|---|---|---|
| 2009/0026798 A1* | 1/2009 | Lee | B60R 21/34 296/187.04 |
| 2010/0181803 A1* | 7/2010 | Uchino | B60R 21/34 296/193.11 |
| 2011/0068607 A1* | 3/2011 | Ott | B60R 21/34 296/192 |
| 2011/0169303 A1* | 7/2011 | Ikeda | B60R 21/34 296/193.11 |
| 2012/0043786 A1* | 2/2012 | Challal | B60R 21/34 296/203.02 |
| 2016/0347375 A1* | 12/2016 | Kaba | B62D 25/081 |
| 2017/0029032 A1* | 2/2017 | Hammer | B60R 21/34 |
| 2017/0129430 A1* | 5/2017 | Aizawa | B60R 19/18 |
| 2017/0144709 A1* | 5/2017 | Nakashima | B62D 25/081 |

* cited by examiner

Closing Deformation

Buckling

FIG. 9

Expansion

Downward Deformation

FRONT VEHICLE-BODY STRUCTURE

BACKGROUND OF THE INVENTION

The present invention relates to a front vehicle-body structure.

It is requested for an automotive vehicle as a vehicle to absorb impact effectively in a vehicle frontal collision, in particular, in a right collision in which the vehicle collides with a pedestrian. European Patent Application Publication No. 1120331 A2 discloses a structure in which a triangular impact absorbing member which is made of a plate member and configured to protrude upward is arranged in a space which is enclosed by reinforcements provided at a front end portion of a bonnet (engine hood). This structure is considered to be applicable for collision of an adult's femur from a forward side or collision of a child's head from an upper side.

In a case where the impact absorbing member is arranged at the front end portion of the bonnet like the structure disclosed in the above-described patent document, some types of vehicle may have a problem that the impact absorption cannot be achieved effectively. That is, there may be some types of vehicle in which another member, such as a fascia upper member, is arranged in front of the bonnet, so that a front end of the bonnet is positioned considerably rearward from a front end of the vehicle (the impact absorbing member is located rearward from a desired position). Further, in a type of vehicle in which the vehicle height is set to be rather high, the level of the front end portion of the bonnet becomes pretty high (the impact absorbing member is located at a higher level than the desired position).

SUMMARY OF THE INVENTION

The present invention has been devised in view of the above-described matter, and an object of the present invention is to provide a front vehicle-body structure which can effectively absorb the impact inputted to the vehicle's front end portion from the forward side or from the upward side.

The front vehicle-body structure of the present invention comprises an upper-face forming member forming an upper face of a vehicle front end portion, and an impact absorbing member provided below the upper-face forming member, wherein the impact absorbing member comprises a front side part which includes a front wall portion, a top wall portion, and a rear wall portion so as to have a U-shaped cross section opening downward and a flat-plate shaped rear side part which extends rearward from a lower end of the rear wall portion of the front side part and a rear end portion of which is held at a vehicle body, the rear side part being configured to slant obliquely forward and downward.

According to the present invention, when the collision load from the forward side is applied, the impact absorption is achieved by the impact absorbing member deforming such that its front side part opening downward closes and by the rear side part of the impact absorbing member having buckling. Meanwhile, when the collision load from the upward side is applied, the impact absorption is achieved by the impact absorbing member deforming such that its front side part opening downward expands and by the rear side part of the impact absorbing member deforming downward. The impact absorbing member can be arranged at an appropriate position for the impact absorption regardless of a longitudinal position (a position in a longitudinal direction) or a level (height) of the front end portion of the bonnet, so that the vehicle-body structure of the present invention is applicable to any type of vehicle, thereby providing a high versatility.

In an embodiment of the present invention, the upper-face forming member is a fascia upper member which is provided in front of a bonnet, covering the front wall portion of the front side part of the impact absorbing member from a forward side and covering the top wall portion of the front side part of the impact absorbing member from an upward side.

According to this embodiment, the impact absorption by the impact absorbing member can be effectively achieved in the type of vehicle in which the fascia upper member is provided in front of the bonnet.

In another embodiment of the present invention, the bonnet is configured such that a front end portion thereof overlaps a rear end portion of the fascia upper member from the upper side and a front end thereof is positioned so as not to protrude forward beyond the front wall portion of the front side part of the impact absorbing member.

This embodiment is preferable in preventing or suppressing a situation where the bonnet deforms when the vehicle collides with a pedestrian, in particular.

In another embodiment of the present invention, the rear end portion of the fascia upper member is fixed to the top wall portion of the front side part of the impact absorbing member.

According to this embodiment, the fascia upper member can be held on a vehicle-body side by utilizing the impact absorbing member held on the vehicle-body side.

In another embodiment of the present invention, a fascia lower member which includes a grill opening portion and grill member which is formed integrally with the fascia lower member and arranged at the grill opening portion are provided below the fascia upper member, and the fascia upper member supports the fascia lower member via the grill member.

According to this embodiment, not only the fascia upper member but the grill member or the fascia lower member can be held on the vehicle-body side by utilizing the impact absorbing member.

Other features, aspects, and advantages of the present invention will become apparent from the following description which refers to the accompanying drawings.

DETAILED DESCRIPTION OF THE INVENTION

Figure 1:
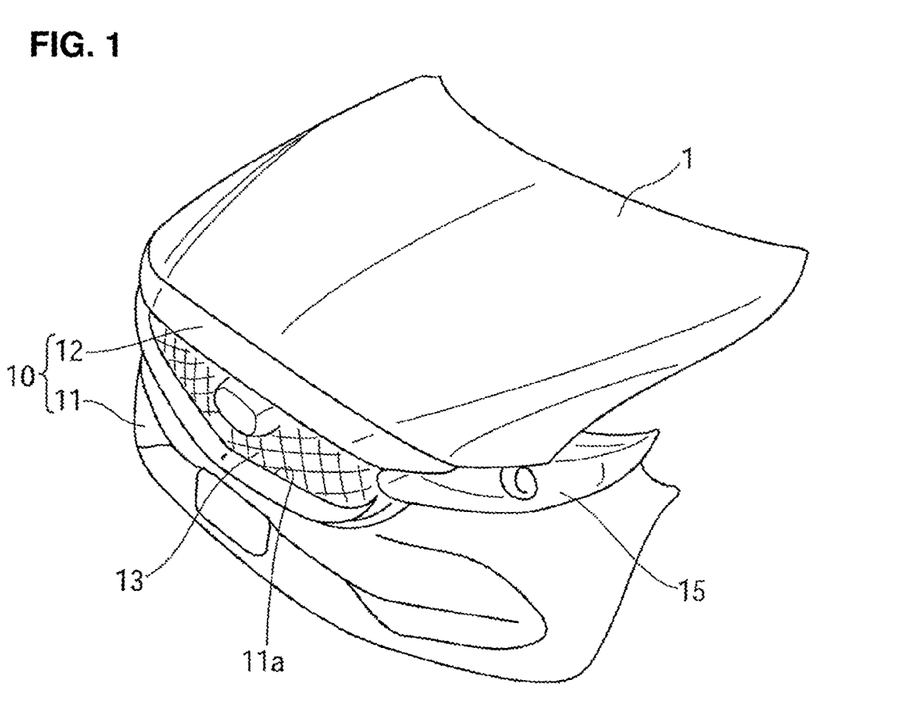
FIG. 1 is a perspective view showing a front portion of a vehicle to which the present invention is applied.

In FIG. 1, reference character 1 denotes a bonnet (engine hood), which covers over an engine room. A bumper fascia 10 is arranged in front of the bonnet 1. The bumper fascia 10 comprises a fascia lower member 11 and a fascia upper member 12. The fascia lower member 11 is a large-sized member, a central portion, in a vehicle width direction, of which has a grill opening portion 11a which opens upward. A grill member 13 is provided at the grill opening portion 11a. The grill member 13 includes many small holes (openings) for taking in air during a vehicle traveling, and is formed integrally with the fascia lower member 11 by means of a fixing tool or the like.

The fascia upper member 12 is a small-sized member, compared with the fascia lower member 11, which is positioned in front of the bonnet 1. The fascia upper member 12 covers the grill opening portion 11a from an upper side (the fascia upper member 12 constitutes an upper edge portion of the grill opening portion 11a). In FIG. 1, reference character 15 denotes a headlight unit.

Figure 2:
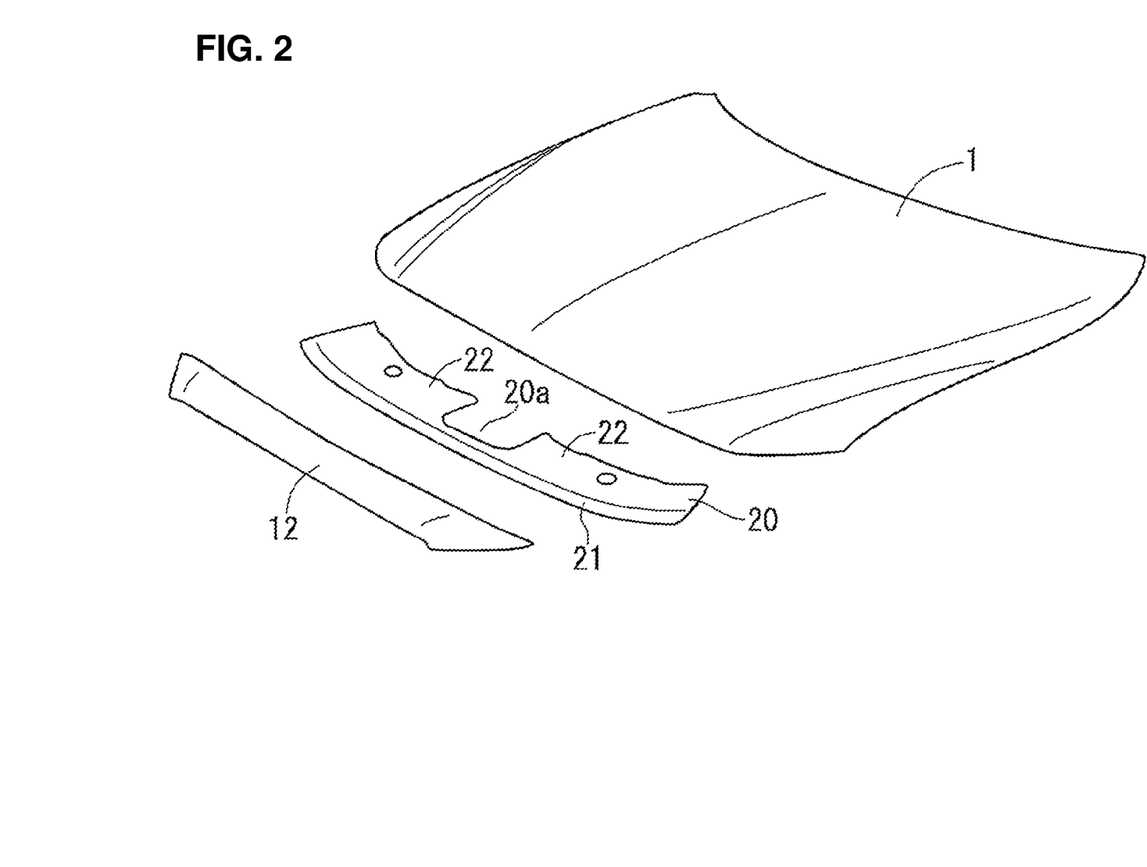
FIG. 2 is an exploded perspective view showing a bonnet, a fascia upper member, and an impact absorbing member.
Figure 3:
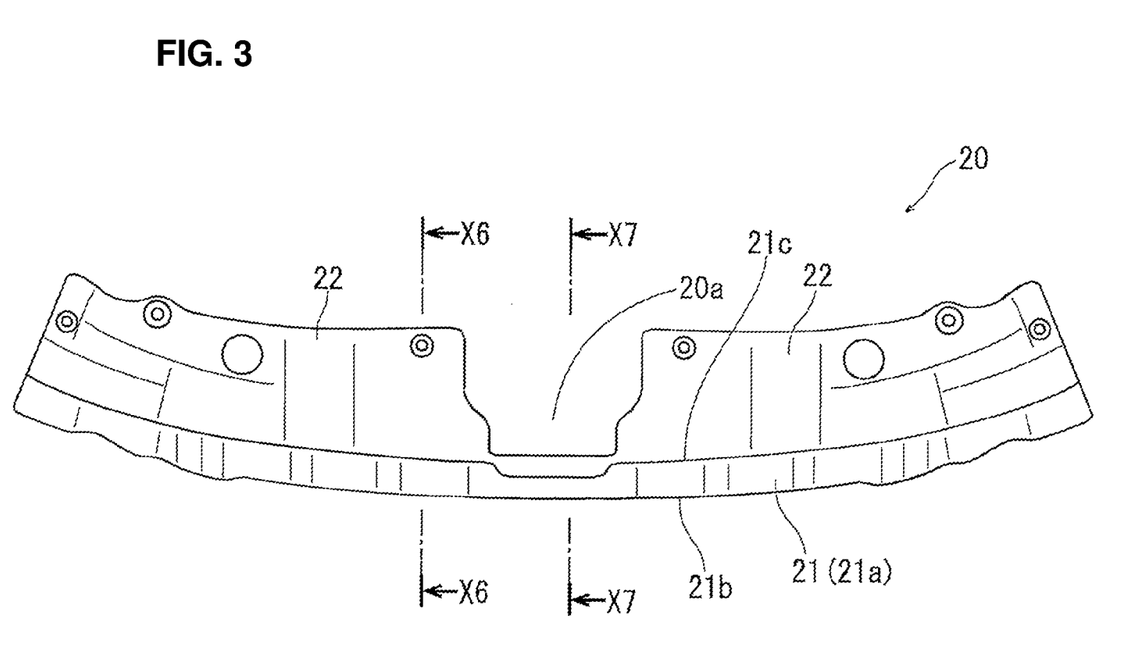
FIG. 3 is a plan view of the impact absorbing member, when viewed from an upper side.
Figure 4:
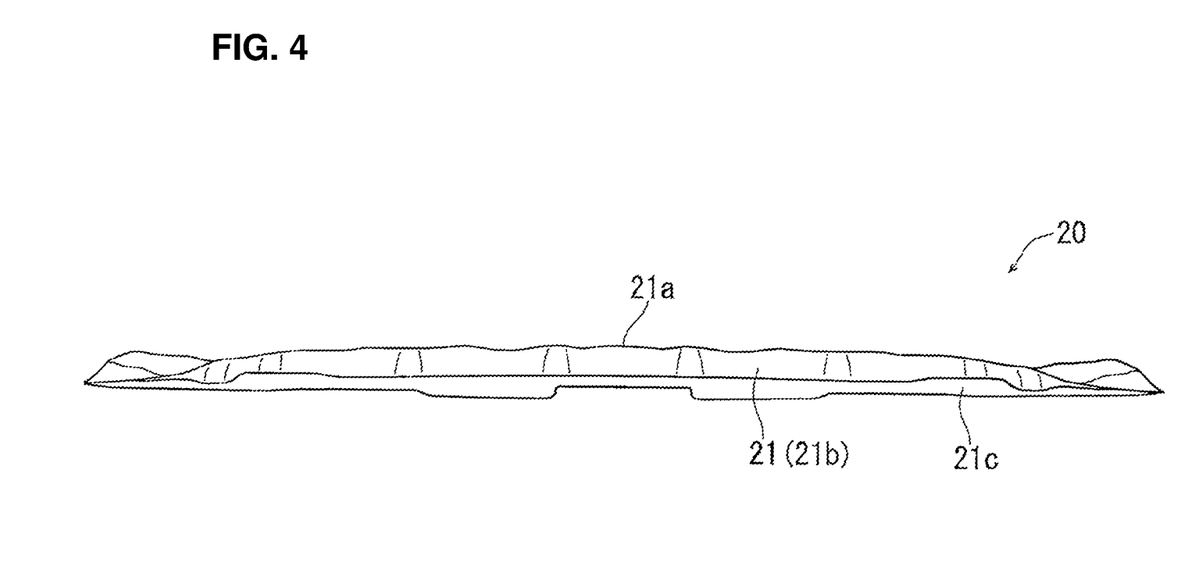
FIG. 4 is a front view of the impact absorbing member, when viewed from a forward side.

An impact absorbing member 20 shown in FIGS. 2-4 is arranged below the bonnet 1 and the fascia upper member 12. The impact absorbing member 20 is made from synthetic resin in an embedment and configured to extend in the vehicle width direction.

The impact absorbing member 20 comprises a front side part 21 and a rear side part 22. The front side part 21 is configured to have a U-shaped cross section opening downward. That is, the front side part 21 comprises a top wall portion 21a which extends substantially horizontally, a front wall portion 21b which extends downward from a front end of the top wall portion 21a, and a rear wall portion 21c which extends downward from a rear end of the top wall portion 21a. The front wall portion 21b and the rear wall portion 21c are positioned substantially in parallel to each other. Further, in the embodiment, a lower end of the front wall portion 21b is located at a higher level than a lower end of the rear wall portion 21c (the rear wall portion 21c extends downward further than the front wall portion 21a does).

Figure 6:
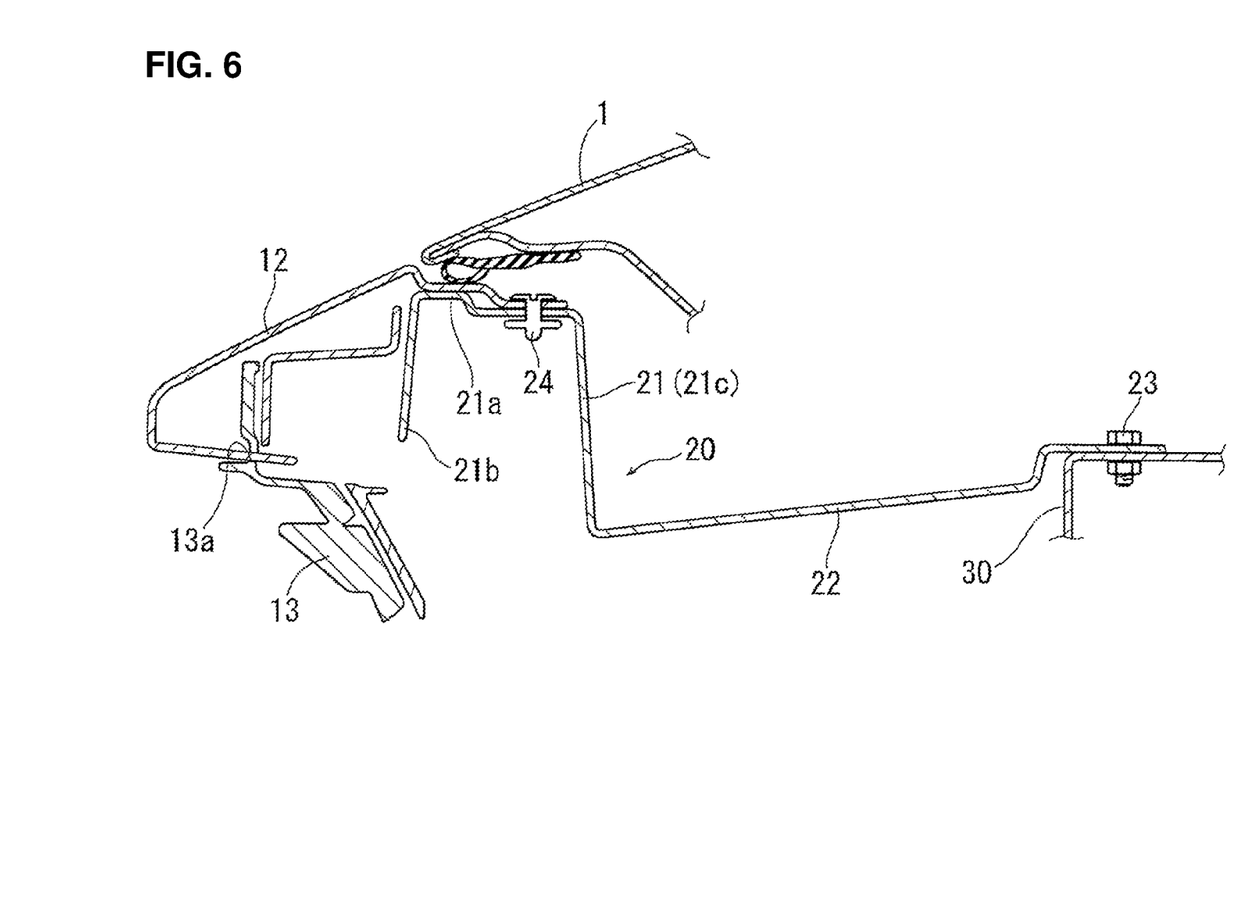
FIG. 6 is a sectional view taken along line X6-X6 of FIG. 3, which shows arrangement relationships of the bonnet, the impact absorbing member, and the fascia upper member.

The above-described rear side part 22 is of a plate shape and extends rearward from a lower end of the rear wall portion 21c. As shown in FIG. 6, a rear end portion of the rear side part 22 is fixed to an upper end portion of a radiator shroud 30 as a vehicle-body-side member by means of a fixing tool 23, such as a bolt. This fixing by means of the fixing tool 23 is conducted at plural points which are spaced apart, in the vehicle width direction, from each other.

Figure 5:
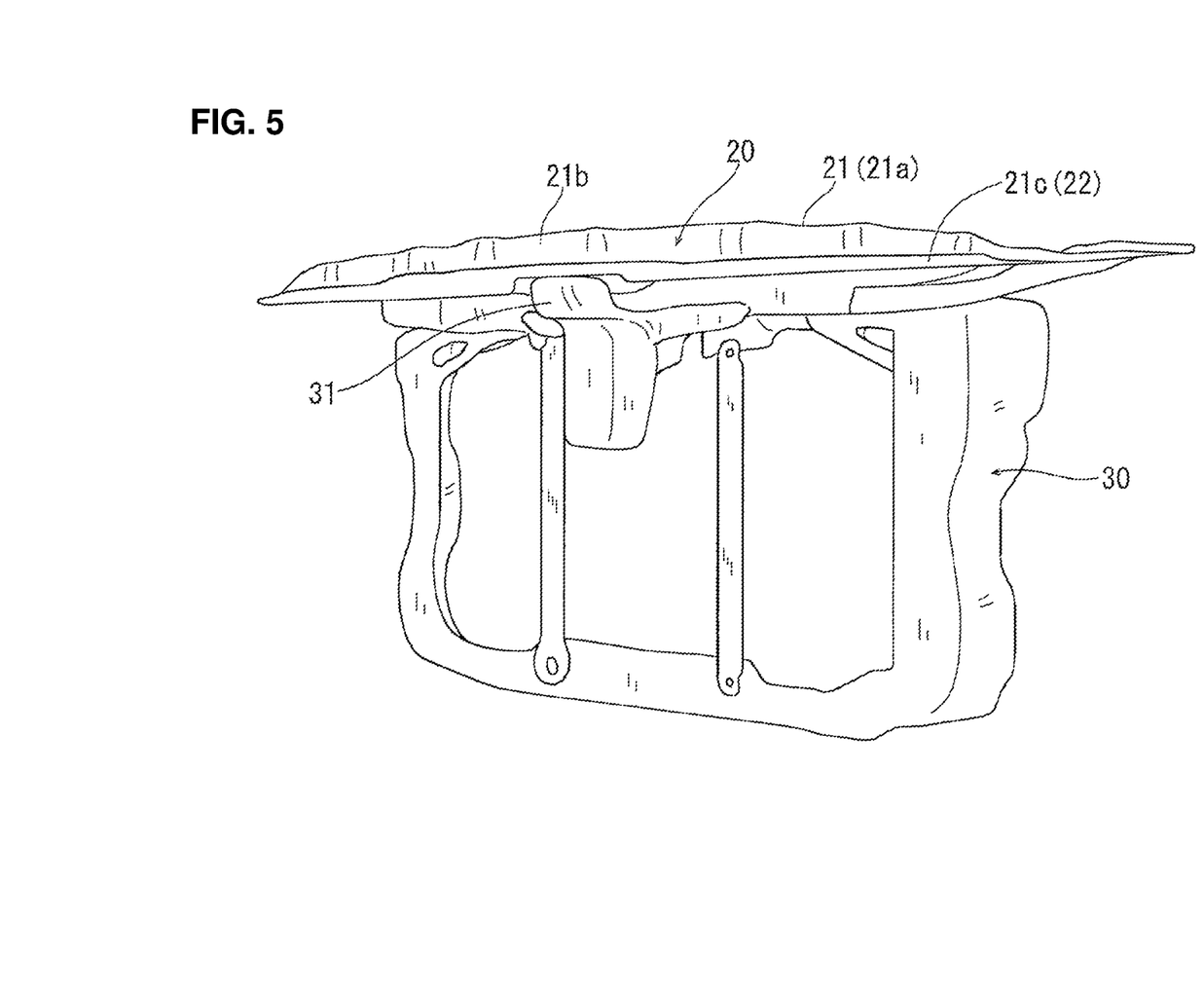
FIG. 5 is a perspective view showing an attachment state of a radiator shroud and the impact absorbing member.

The impact absorbing member 20 which is held by the radiator shroud 30 is shown in FIG. 5. In FIG. 5, a lock stay 31 is fixed to an upper end portion of a central portion, in the vehicle width direction, of the radiator shroud 30. A lock mechanism (not illustrated) for locking the bonnet 1 is held at the lock stay 31.

The impact absorbing member 20 has a cutout portion 20a such that it is divided into a right-side part and a left-side part at is center where the cutout portion 20a is formed (see FIGS. 2 and 3). This cutout portion 20a is a space where a latch (not illustrated) which is fixed to a lower face of the front end portion of the bonnet 1 is capable of being inserted.

As shown in FIG. 6, a rear end portion of the fascia upper member 12 is fixed to the top wall portion 21a by means of a fixing tool 24 such that it covers over the top wall portion 21a of the impact absorbing member 20. That is, the fascia upper member 12 is held (supported) at the vehicle-body side via the impact absorbing member 20. Further, a front end portion of the fascia upper member 12 is bent rearward and forms an upper end portion of the grill member 13, and is inserted into an engagement hole 13a. Thus, the fascia lower member 11 is held (supported) at the vehicle-body side (the radiator shroud 30) via the grill member 13, the fascia upper member 12, and the impact absorbing member 20.

The front end portion of the bonnet 1 is positioned such that it covers over the rear end portion of the fascia upper member 12, and a front end of the bonnet 1 is smoothly continuous to the fascia upper member 12.

Figure 7:
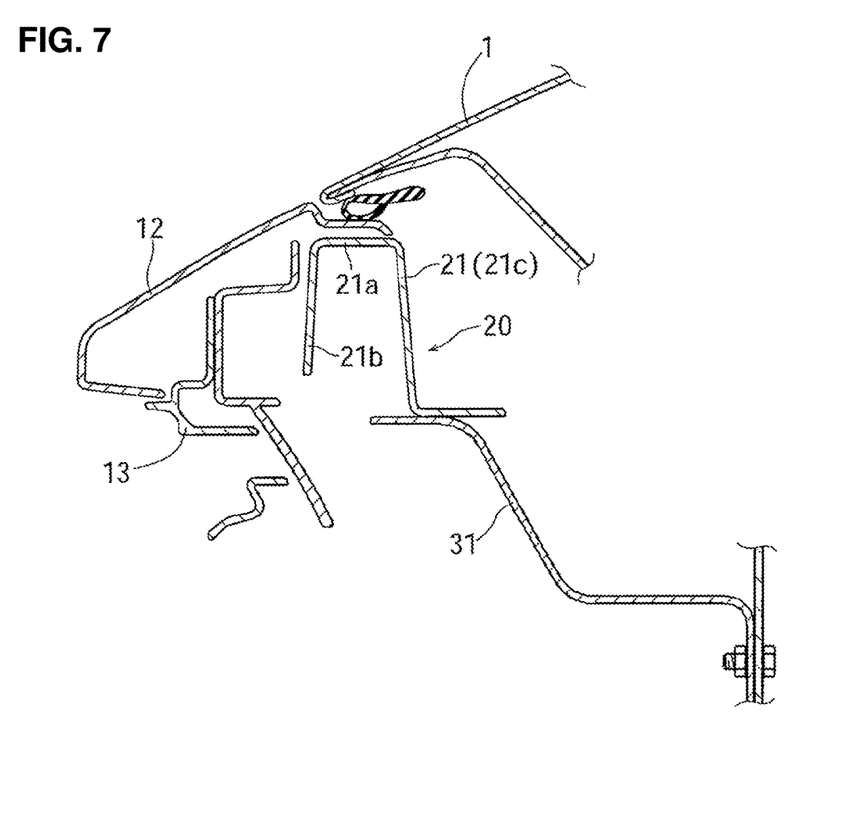
FIG. 7 is a sectional view taken along line X7-X7 of FIG. 3, which shows the arrangement relationships of the bonnet, the impact absorbing member, and the fascia upper member.

As shown in FIG. 7, a central portion, in the vehicle width direction, of the impact absorbing member 20 (specifically, a lower end of the rear wall portion 21c) is seated at the above-described lock stay 31. The impact absorbing member 20 merely contacts the lock stay 31 from the upper side so that it is relatively movable in the longitudinal direction. Thus, the impact absorbing member 20 is fixed to the radiator shroud 31 at a rear end portion thereof and held (supported) by the lock stay 31 at a central portion, in the vehicle width direction, thereof, so that holding/supporting of the impact absorbing member 20 by the vehicle body is achieved securely.

Figure 8:
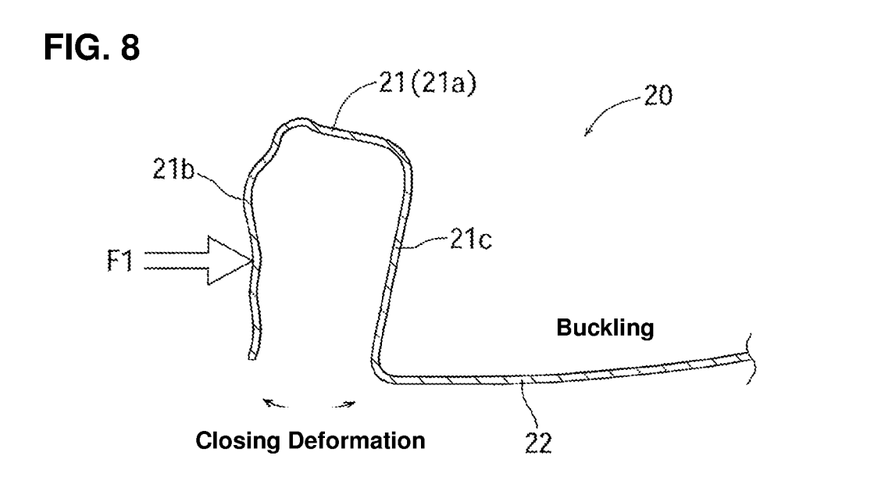
FIG. 8 is a diagram showing a situation of impact absorption by the impact absorbing member when the impact absorbing member receives an external force applied from the forward side.

Hereafter, the impact absorption achieved by the impact absorbing member 20 will be described. FIG. 8 shows a case where an external force F1 from the forward side is applied to the impact absorbing member 20 via the fascia upper member 12, and this external force F1 is assumed to be a load from a femur of an adult pedestrian. In this case, the front side part 21 having the U-shaped cross section deforms such that the U-shaped cross section crushes in the longitudinal direction (such that a lower end of the front wall portion 21b and a lower end of the rear wall portion 21c approach each other) and the rear side part 22 has buckling, thereby absorbing the impact. The front end portion of the bonnet 1 may not deform substantially (mostly) depending on the magnitude of the external force F1. Herein, since the impact absorbing member 20 is seated at the lock stay 31 merely, the buckling function of the rear side part 22 is not blocked (prevented) by the lock stay 31.

Figure 9:
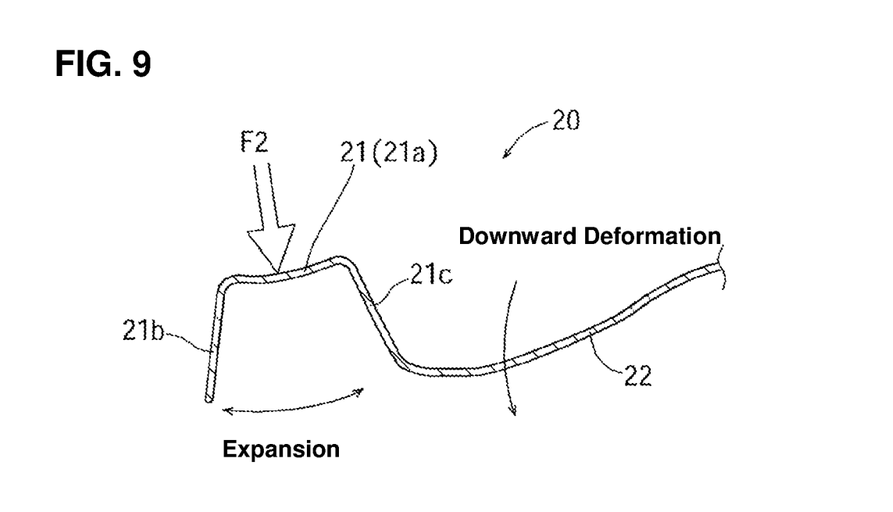
FIG. 9 is a diagram showing a situation of the impact absorption by the impact absorbing member when the impact absorbing member receives an external force applied from the upward side.

FIG. 9 shows a case where an external force F2 is applied to the fascia upper member 12 from the upward side, and this external force F2 is assumed to be a load from a head of a child. In this case, the front side part 21 having the U-shaped cross section deforms such that it opens (such that a distance between the lower end of the front wall portion 21b and the lower end of the rear wall portion 21c expands) and the rear side part 22 deforms such that it is bent downward, thereby absorbing the impact. The front end portion of the bonnet 1 does not deform mostly because of the external force F2. Through the expanding deformation of the front wall portion 21b and the rear wall 21c, the rear wall portion 21c deforms rearward relatively to the lock stay 31, so that supporting of the lock stay 31 is released.

The impact absorbing member 20 can be located at the best position desired for the impact absorption regardless of differences in the longitudinal position and the level (height) position of the front end of the bonnet 1, so that the vehicle-body structure of the present invention is applicable to any type of vehicle.

While the embodiment has been described, the present invention should not be limited to the present embodiment and any other modifications or improvements may be applied within the scope of a spirit of the present invention. The fascia lower member 11 and the fascia upper member 12 may be formed integrally like a sport car, for example. The front end of the bonnet 1 may be configured to substantially form the front end of the vehicle-body upper face, without the fascia upper member 12. While the rear side part 22 of the impact absorbing member 20 may be configured to extend roughly horizontal or slant obliquely forward and upward, not slanting obliquely forward and downward, it is preferable to configure the rear side part 22 to slant obliquely forward and downward from a perspective of its smooth downward-bending deformation against the external force F2 applied from the upper side. A structure in which the impact absorbing member 20 is not supported by the lock stay 31 may be applied. Of course, the object of the present invention includes anything which has been described not only explicitly but implicitly as preferences or merits.

What is claimed is:

1. A front vehicle-body structure, comprising:
    an upper-face forming member forming an upper face of a vehicle front end portion and provided in front of a bonnet; and
    an impact absorbing member provided below the upper-face forming member,
    wherein
    said impact absorbing member comprises a front side part which includes a front wall portion, a top wall portion, and a rear wall portion so as to have a U-shaped cross section opening downward and a flat-plate shaped rear side part which extends rearward from a lower end of the rear wall portion of said front side part and a rear end portion of which is held at a vehicle body, the rear side part being configured to slant obliquely forward, and
    said upper-face forming member covers said front wall portion of the front side part of the impact absorbing member from a forward side and covers said top wall portion of the front side part of the impact absorbing member from an upward side.

2. The front vehicle-body structure of claim 1, wherein said upper-face forming member is a fascia upper member, and
    said bonnet is configured such that a front end portion thereof overlaps a rear end portion of said fascia upper member from the upper side and a front end thereof is positioned so as not to protrude forward beyond said front wall portion of the front side part of the impact absorbing member.

3. The front vehicle-body structure of claim 1, wherein said upper-face forming member is a fascia upper member, and
    said rear end portion of the fascia upper member is fixed to said top wall portion of the front side part of the impact absorbing member.

4. The front vehicle-body structure of claim 2, wherein said rear end portion of the fascia upper member is fixed to said top wall portion of the front side part of the impact absorbing member.

5. The front vehicle-body structure of claim 3, wherein a fascia lower member which includes a grill opening portion and grill member which is formed integrally with said fascia lower member and arranged at said grill opening portion are provided below said fascia upper member, and said fascia upper member supports the fascia lower member via said grill member.

6. The front vehicle-body structure of claim 4, wherein a fascia lower member which includes a grill opening portion and grill member which is formed integrally with said fascia lower member and arranged at said grill opening portion are provided below said fascia upper member, and said fascia upper member supports the fascia lower member via said grill member.

7. The front vehicle-body structure of claim 1, wherein the rear side part is configured to slant obliquely forward and downward.

8. The front vehicle-body structure of claim 1, wherein the rear side part is configured to slant obliquely forward and upward.

9. A front vehicle-body structure, comprising:
    an upper-face forming member forming an upper face of a vehicle front end portion; and
    an impact absorbing member provided below the upper-face forming member,
    wherein
    said impact absorbing member comprises a front side part which includes a front wall portion, a top wall portion, and a rear wall portion so as to have a U-shaped cross section opening downward and a flat-plate shaped rear side part, which extends rearward and upward from a lower end of the rear wall portion of said front side part, and a rear end portion of which is held at a vehicle body, the rear side part being configured to slant obliquely forward, and
    said upper-face forming member is a fascia upper member which is provided in front of a bonnet, covering said front wall portion of the front side part of the impact absorbing member from a forward side and covering said top wall portion of the front side part of the impact absorbing member from an upward side.

10. The front vehicle-body structure of claim 9, wherein said bonnet is configured such that a front end portion thereof overlaps a rear end portion of said fascia upper member from the upper side and a front end thereof is positioned so as not to protrude forward beyond said front wall portion of the front side part of the impact absorbing member.

11. The front vehicle-body structure of claim 9, wherein said rear end portion of the fascia upper member is fixed to said top wall portion of the front side part of the impact absorbing member.

12. The front vehicle-body structure of claim 10, wherein said rear end portion of the fascia upper member is fixed to said top wall portion of the front side part of the impact absorbing member.

13. The front vehicle-body structure of claim 11, wherein a fascia lower member which includes a grill opening portion and grill member which is formed integrally with said fascia lower member and arranged at said grill opening portion are provided below said fascia upper member, and said fascia upper member supports the fascia lower member via said grill member.

14. The front vehicle-body structure of claim 12, wherein a fascia lower member which includes a grill opening portion and grill member which is formed integrally with said fascia lower member and arranged at said grill opening portion are provided below said fascia upper member, and said fascia upper member supports the fascia lower member via said grill member.

15. The front vehicle-body structure of claim 9, wherein the rear side part is configured to slant obliquely forward and downward.

16. A front vehicle-body structure, comprising:
an upper-face forming member forming an upper face of a vehicle front end portion; and
an impact absorbing member provided below the upper-face forming member,
wherein
said impact absorbing member comprises a front side part which includes a front wall portion, a top wall portion, and a rear wall portion so as to have a U-shaped cross section opening downward and a flat-plate shaped rear side part, which extends rearward and upward from a lower end of the rear wall portion of said front side part, and a rear end portion of which is held at a vehicle body, the rear side part being configured to slant obliquely forward, and
the rear side part is configured to slant obliquely forward and upward.

17. The front vehicle-body structure of claim 9, wherein said flat-plate shaped rear side part is formed continuously in a vehicle length direction from a first point where said flat-plate shaped rear side part is connected to said upper-face forming member to a second point where said flat-plate shaped rear side part is connected to said rear end portion.

\* \* \* \* \*